3,007,897
PROCESS FOR THE PRODUCTION OF EUPOLYOXYMETHYLENES

Jürgen Behrends, Hanau (Main), and Otto Schweitzer, Konigstein (Taunus), Germany, assignors to Deutsche Gold- und Silber-Scheideanstalt vormals Roessler, Frankfurt am Main, Germany
No Drawing. Filed Aug. 11, 1960, Ser. No. 48,828
Claims priority, application Germany Aug. 17, 1959
7 Claims. (Cl. 260—67)

The present invention relates to the production of eupolyoxymethylenes using essentially water free formaldehyde and a novel catalyst as the reactants.

Eupolyoxymethylenes can be produced by a variety of procedures. Among these procedures there is, for example, the technique of polymerizing monomeric water free, that is, essentially water free, formaldehyde in an inert liquid reaction medium in the absence of water and in the presence of dispersing agents, polymerization catalysts, stabilizers, and the like. Among the catalysts used in these techniques, there are, for example, amines, as disclosed in U.S. 2,768,994 and in Staudinger and Kern's "Die hochmolekularen Verbindungen," 1932, Berlin, Springer-Verlag, pages 280 to 287. Other formaldehyde polymerization catalysts that are known are the arsines, stibines and phosphines as well as metal carbonyls, metal organic compounds, onium compounds and polymers containing tertiary nitrogen.

The art is also aware of the technique of so conducting the polymerization process that a small initial portion of the formaldehyde is polymerized in the reaction medium first and the resulting small quantity of polymer is removed with any impurities that may have been in the reaction medium and which were taken up by the small quantity of polymer, and the major portion of the monomer is subsequently polymerized in the same, but relatively much purer, reaction medium.

It has now been found according to the present invention that eupolyoxymethylenes can be produced in good yields by the polymerization of monomeric formaldehyde in the presence of a polymerization catalyst in an inert liquid medium if the monomeric formaldehyde used as the starting material is as water free as possible and at least one fine particle sized hydroxide and/or oxide and/or peroxide of an alkali metal or alkaline earth metal is used as the polymerization catalyst.

It is advantageous in this regard that the catalyst be used in such a finely divided state that it can be placed in suspension in the liquid organic polymerization medium with the aid of the usual suspending agents and emulsifiers that are known to the art. The fine dispersion of the catalyst in the liquid organic polymerization medium contemplated by the present invention can be accomplished, for example, with the aid of an efficient dispersing apparatus.

The particle size of the catalyst should be within the range of 10–500μ, the range below 50μ is preferred.

The catalysts to be used in the process of the present invention include, for example, cesium hydroxide, strontium hydroxide, rubidium hydroxide, sodium hydroxide, potassium hydroxide, lithium hydroxide, barium hydroxide, calcium hydroxide, sodium oxide, sodium peroxide and barium peroxide. Particularly good results are obtained with lithium hydroxide.

It is preferable to use water free benzine, that is, as water free as possible, which has an average boiling range of about 100–140° C., as the liquid organic medium in the process of the present invention. The water contents of the liquid organic medium should not exceed 30 mg./l.

For the purposes of this invention the liquid organic medium should contain dispersed therein 0.0005 to 2.0 g. and preferably 0.001 to 0.5 g. of the particular catalyst to be used.

It is also often advantageous to introduce the monomeric water free formaldehyde into the reaction medium together with a carrier gas such as nitrogen, air or the like.

What is meant by water free formaldehyde within the meaning of the present invention is any monomeric formaldehyde containing preferably less than 0.5% water, regardless of the origin of or manner of producing the monomer.

The eupolyoxymethylenes produced by the process of this invention are obtained in yields of 25 to 50% in the form of fine, sand sized, particles. The molecular weight ranges from 10,000 to 50,000 depending on the combination of reaction conditions and particular catalyst employed. In general the polymers are readily blocked by techniques commonly known to polymer chemists as, for example, by acetylation. After the termination of the polymerization reaction the catalyst residue still present in the polymer mass can be washed out with the aid of a suitable solvent such as water.

These polymers can be processed in the customary thermoplastic procedures, for example, injection molding pressing and the like, to produce formed objects or they can be used as coating materials. If necessary, the polymerization process of the present invention can also be conducted in the presence of such materials as will further favorably influence the production of the polymers and/or the stability and/or the mechanical properties of the formed bodies made therefrom. These materials would include plasticizers such as the glycols, particularly propylene glycol and stabilizers such as urea, hydrozine and the like. The formed bodies obtained from these polymers possess increased thermal stability.

Fillers and/or coloring agents can also be used in admixture with these eupolyoxymethylenes. These auxiliary materials would include in particular glass wool and mineral wool.

It is also advantageous in this regard to use, with the polymers, highly dispersed, particularly, active fillers, for example, carbon black, preferably alkaline carbon black, or oxides of metals or metalloids such as aluminum oxide, titanium oxide, zirconium oxide or silicon dioxide which have been produced by the reaction of volatile compounds of these materials at elevated temperatures in an oxidizing or hydrolyzing medium.

The production of the eupolyoxymethylenes according to the present invention can be carried out continuously. In this procedure unreacted monomeric formaldehyde and oligomers, the latter after being split up, are recycled to the initial phase of the continuous operation. The homogeneous dispersion of the catalyst is maintained throughout the polymerization reaction system by techniques commonly known to those working in the polymerization art.

The following examples are merely illustrative of the present invention and are not intended as a limitation upon its scope.

Example 1

A continuous stream of gaseous, water free, monomeric formaldehyde, supplied from an adequate generating apparatus, was introduced into a suspension of 1.00 g. of sodium hydroxide in 2000 ml. of dry benzine for 30 minutes. During this time, the temperature of the reaction system rose from 26° to 50° C. and the resulting polymer precipitated out as a white mass. After the termination of the vigorous reaction the polymer was removed on a suction filter, washed with water and dried in the air. The yield amounted to 26% based on the amount of formaldehyde introduced into the system.

The polymerizate showed a vaporization loss of 20% after heating at 200° C. for 20 minutes in the presence of air. After acetylation with the anhydrid of acetic acid the loss was only 14%.

*Example 2*

0.5 g. of sodium hydroxide were homogeneously dispersed in 1.7 liters of dry benzine. Gaseous, water free, monomeric formaldehyde was then introduced into this dispersion for 30 minutes and the temperature in the system quickly rose from 26° to 41° C. 33.5 g. of a eupolyoxymethylene having a molecular weight of about 15,000 precipitated out and was recovered as in Example 1. Without acetylation the vaporization loss of the product was 30%.

*Example 3*

21 g. of eupolyoxymethylene were formed within 30 minutes by the introduction of gaseous, water free, monomeric formaldehyde into a suspension of 250 mg. of sodium hydroxide in 2 liters of dry benzine. The product was removed on a suction filter, washed with water and dried in the air. Its molecular weight was approximately 13,000. Without blocking by acetylation the vaporization loss was 32%.

*Example 4*

31.5 g. of eupolyoxymethylene having an average molecular weight of about 20,000 were formed by introducing gaseous, water free, monomeric formaldehyde for 30 minutes into a suspension of 250 mg. of sodium hydroxide in 2 liters of dry benzine. The polymer was recovered as in Example 1. During the reaction the temperature rose from 23 to 41° C.

*Example 5*

700 mg. of barium hydroxide were suspended in 2 liters of dry benzine with 1 g. of a commercial emulsion stabilizer.

Gaseous, water free, monomeric formaldehyde was then introduced into this suspension for 30 minutes. During this time 16 g. of a dense eupolyoxymethylene precipitated out. The loss by vaporization displayed by this polymer after being subjected to a temperature of 200° C. for 20 minutes in a testing tube amounted to 66.2%.

The reaction temperature was about 23° C. The emulsion stabilizer consisted of a polyethylene glycol ether (25 ethoxy groups) of spermyl alcohol, known under the trade name Emulphor O.

*Example 6*

A relatively low molecular weight (12,000) eupolyoxymethylene was obtained in almost 50% yields by introducing gaseous, water free, monomeric formaldehyde into a suspension of 700 mg. of sodium oxide in 2 liters of benzine for a half hour. The temperature rose from 15 to 44° C. during the reaction. The sand sized particles of the polymer were removed on a suction filter, washed with water and dried in the air.

The vaporization loss after acetylation as described and measured in Example 1 was 19%.

*Example 7*

Gaseous, water free, monomeric formaldehyde was introduced for 30 minutes into a suspension of 700 mg. of lithium hydroxide in 1.8 liters of benzine which had been produced with the aid of a commercial emulsion stabilizer, as described in Example 5.

During the introduction of the monomer the temperature of the system rose from 22° to 55° C. 63 g. of eupolyoxymethylene were recovered by removing the polymer on a suction filter, washing it with water and drying it in the air.

*Example 8*

A uniform stream of gaseous, water free, monomeric formaldehyde was introduced into a suspension of 500 mg. of sodium peroxide in 2 liters of benzine for 30 minutes. After the termination of the reaction, during which the temperature of the system rose from 23 to 50° C., 61 g. of eupolyoxymethylene were produced which were recovered as in Example 1.

The vaporization loss after acetylation as described and measured in Example 1 was 16%.

*Example 9*

700 mg. of calcium hydroxide were finely dispersed in 1.8 liters of benzine with the aid of 1 g. of a commercial emulsion stabilizer, described in Example 5.

Gaseous, water free, monomeric formaldehyde was then introduced into the suspension for 30 minutes. 35 g. of a dense eupolyoxymethylene formed as the temperature of the system rose from 24 to 32° C. The polymer was removed on a suction filter, washed with water and dried in the air. Its molecular weight was about 10,000.

*Example 10*

Gaseous, water free, monomeric formaldehyde was introduced into a suspension of 500 mg. of barium peroxide in 2 liters of benzine for 30 minutes. The suspension had been produced with the aid of 1 g. of an emulsion stabilizer, as described in Example 5. The temperature of the reaction system rose from 21 to 41° C. during the introduction of the monomer. 20 g. of a eupolyoxymethylene having an average molecular weight of 21,000 was thereby produced. After being removed from the reaction system, washed and dried the polymer was tested for high temperature vaporization loss. After 20 minutes at 200° C. it had a vaporization loss of 69.6%.

The vaporization loss after acetylation as described and measured in Example 1 was 14%.

*Example 11*

1 mg. of sodium hydroxide were suspended in 2 liters of dry benzine with the aid of a suspension agent as described in Example 5, and gaseous, water free, monomeric formaldehyde was introduced into this suspension for 1 hour. By the time the temperature had climbed from 21.5° C. (initial temperature) to 27.5° C., 14 g. of eupolyoxymethylene had precipitated out as a white, loose flocculent mass. The average molecular weight of the polymer was 21,300.

The vaporization loss after acetylation as described and measured in Example 1 was 20%.

*Example 12*

0.5 g. of cesium hydroxide were suspended in 2000 ml. of dry benzine. Then gaseous, water free, monomeric formaldehyde was introduced into this suspension for 2 hours. During this time the temperature of the system climbed from an initial temperature of 28° C. to 42° C. and 60 g. of a very loose and fluocculent eupolyoxymethylene precipitated out. The molecular weight was 22,000.

The vaporization loss after acetylation as described and measured in Example 1 was 18%.

*Example 13*

A suspension of 800 mg. of rubidium hydroxide in 2.2 liters of benzine was first prepared with the aid of a dispersion apparatus and gaseous, water free, monomeric formaldehyde was thereafter introduced into this suspension for two hours. 83 g. of a flocculent precipitate were thereby produced.

*Example 14*

500 mg. of strontium hydroxide were suspended in 2 liters of benzine and gaseous, water free, monomeric formaldehyde was then introduced into this suspension for 2 hours. During this time the temperature of the system climbed from 26 to 42.5° C. and 64 g. of white, flocculent eupolyoxymethylene precipitated out which had an average molecular weight of 45,000.

The vaporization loss after acetylation as described and measured in Example 1 was 20%.

*Example 15*

Example 7 was repeated except that only 1 mg. of lithium hydroxide in 2 liters of dry benzine was used and no emulsion stabilizer was present. The introduction of the monomeric formaldehyde lasted 75 minutes at a temperature between 20–23° C. A white eupolyoxymethylene was recovered as described in Example 7.

*Example 16*

Gaseous, water free, monomeric formaldehyde was introduced for 18 minutes into a suspension of 4 g. calcium hydroxide. During the introduction of the monomer the temperature of the system rose from 21.5° to 57.5° C. 120 g. of eupolyoxymethylene were recovered as a snow white, pulverulent substance.

It is also possible to use as liquid organic medium in the process of the present invention halogenated hydrocarbon, e.g. trichloroethylene, carbon tetrachloride, methylene chloride, cyclohexene, benzene, decaline and the like. In all the foregoing examples the rate of flow of the monomeric formaldehyde into the organic medium was 200 l./h., a rate which is preferred, but also any rate between 50 and 500 l./h. can be used.

The molecular weights shown in the foregoing examples are relative molecular weights, which were measured according to methods which are customary in Germany. The absolute molecular weights being about 20% higher.

We claim:

1. An improved process for the production of eupolyoxymethylenes comprising introducing under essentially water free conditions monomeric formaldehyde into an inert liquid organic medium containing 0.0005 to 2.0 g. per liter of at least one finely divided polymerization catalyst selected from the group consisting of alkali metal hydroxides, oxides and peroxides and alkaline earth metal hydroxides, oxides and peroxides.

2. A process as in claim 1 in which said catalyst is maintained in suspension in said inert liquid organic medium.

3. A process as in claim 2 in which said suspension is maintained with the aid of a dispersing agent.

4. A process as in claim 1 in which said inert liquid organic medium is essentially water free benzine.

5. A process as in claim 1 in which 0.001 to 0.5 g. of said catalyst is used per liter of said inert liquid organic medium.

6. A process as in claim 1 in which said monomeric formaldehyde is introduced in gaseous form.

7. A process as in claim 1 in which said monomeric formaldehyde is mixed with an inert carrier gas.

References Cited in the file of this patent

UNITED STATES PATENTS 2,551,365    Craven _____ May 1, 1951

OTHER REFERENCES

Walker, J. F.: Formaldehyde, Reinhold Pub. Co., N.Y. (1953), pp. 177–179.